(12) United States Patent
Dai et al.

(10) Patent No.: US 6,459,008 B1
(45) Date of Patent: Oct. 1, 2002

(54) SELECTIVE HYDROGENATION CATALYST SYSTEM AND PROCESS FOR PREPARING THE SAME AND ITS USE

(75) Inventors: Wei Dai, Beijing (CN); Jing Zhu, Beijing (CN); Helong Li, Beijing (CN); Yanlai Guo, Beijing (CN); Wei Mu, Beijing (CN); Hui Peng, Beijing (CN); Xin Chen, Beijing (CN)

(73) Assignees: China Petro-Chemical Corporation, Beijing (CN); Beijing Research Institute of Chemical Industry, Sinopec, Beijing (CN)

( * ) Notice: Subject to any disclaimer, the term of this patent is extended or adjusted under 35 U.S.C. 154(b) by 0 days.

(21) Appl. No.: 09/599,612

(22) Filed: Jun. 23, 2000

(30) Foreign Application Priority Data

Jun. 25, 1999 (CN) ......................... 99109341 A

(51) Int. Cl.$^7$ ................................. C07C 4/02
(52) U.S. Cl. ........................ 585/651; 585/653
(58) Field of Search ............... 502/102, 240, 502/258, 261, 262, 325, 326, 327, 328, 329, 330, 331, 333, 339, 340, 341, 342–350, 353, 354, 355, 439; 585/651, 653

(56) References Cited

U.S. PATENT DOCUMENTS

| | | | | |
|---|---|---|---|---|
| 3,962,139 A | * | 6/1976 | Van De Moesdijk et al. | 252/463 |
| 3,969,274 A | * | 7/1976 | Frampton | 252/456 |
| 4,079,097 A | * | 3/1978 | Antos | 260/683.3 |
| 4,097,367 A | * | 6/1978 | Haag et al. | 208/135 |
| 4,102,822 A | * | 7/1978 | Mulaskey | 252/465 |
| 4,247,725 A | * | 1/1981 | Ohmori et al. | 585/259 |
| 4,284,835 A | * | 8/1981 | Kim et al. | 585/277 |
| 4,407,733 A | * | 10/1983 | Birkenstock et al. | 502/174 |
| 4,533,779 A | * | 8/1985 | Boitiaux et al. | 585/259 |
| 4,548,921 A | * | 10/1985 | Geus et al. | 502/330 |
| 4,587,369 A | * | 5/1986 | Cosyns et al. | 585/259 |
| 4,743,577 A | * | 5/1988 | Schroeder et al. | 502/326 |
| 4,906,800 A | * | 3/1990 | Henry et al. | 585/260 |
| 5,063,194 A | * | 11/1991 | Broecker et al. | 502/314 |
| 5,463,154 A | * | 10/1995 | Slim et al. | 585/261 |
| 5,502,269 A | * | 3/1996 | Sarrazin et al. | 585/668 |
| 5,521,139 A | * | 5/1996 | Brocker et al. | 502/314 |
| 5,538,931 A | * | 7/1996 | Heinrichs et al. | 502/234 |
| 5,648,576 A | * | 7/1997 | Nguyen Than et al. | 585/260 |
| 5,753,583 A | * | 5/1998 | Heineke et al. | 585/326 |
| 5,821,397 A | * | 10/1998 | Joly et al. | 585/262 |
| 5,866,734 A | * | 2/1999 | Flick et al. | 585/260 |
| 5,889,187 A | * | 3/1999 | Nguyen Than et al. | 585/260 |
| 6,054,409 A | * | 4/2000 | Nguyen Than et al. | 502/330 |
| 6,127,310 A | * | 10/2000 | Brown et al. | 502/339 |
| 6,239,322 B1 | * | 5/2001 | Didillon et al. | 585/260 |

* cited by examiner

Primary Examiner—Stanley S. Silverman
Assistant Examiner—Cam N. Nguyen
(74) Attorney, Agent, or Firm—Banner & Witcoff, Ltd.

(57) ABSTRACT

A selective hydrogenation catalyst system, and a process for its preparation and its use. The catalyst system of the invention comprises a support material, a Pd-containing catalyst component and a Bi-containing cocatalyst component. The catalyst system of the invention is manufactured by impregnating the support material simultaneously or separately with Pd-containing solution, Bi-containing solution or/and one or more other cocatalyst solutions, and then drying and calcining. The activity and selectivity of the catalyst system of the invention, in selective hydrogenation of acetylenic and diolefmic compounds in hydrocarbon feeds, are significantly improved, while the green oil formation and carbon deposit on the catalyst reduced, and the service life increased and production costs decreased.

11 Claims, No Drawings

SELECTIVE HYDROGENATION CATALYST SYSTEM AND PROCESS FOR PREPARING THE SAME AND ITS USE

FIELD OF THE INVENTION

This invention relates to a selective hydrogenation catalyst system, a method of preparing this catalyst system and a process for selectively hydrogenating acetylenic and diolefinic compounds in hydrocarbon feeds, especially in $C_2$–$C_{10}$ hydrocarbon fractions, to mono-olefins employing the catalyst system. More particularly, this invention relates to a selective hydrogenation Pd- and Bi-containing catalyst system, and its preparation and use.

BACKGROUND OF THE INVENTION

In the hydrocarbon feeds as a source of polymerization grade olefins such as ethylene; propylene, butylenes and aromatics hydrocarbons, for example in $C_2$–$C_{10}$ hydrocarbons, such as in propylene-propane feeds, there exist significant amountic of diolefins and acetylenic compounds, for example about 0.3–3% acetylenes and diolefins, which must be pre-removed by selective hydrogenation because such impurities are poisons of polyolefin (such as polyethylene etc.) catalyst, and influence the polymerization of olefin. In order to avoid said catalyst poisoning, the selective catalystic hydrogenation to make acetylenic and diolefinic compounds convert to mono-olefins is generally used. However, in the reaction of acetylenes and diolefins removal by selective hydrogenation, the acetylenes and diolefins adsorbed on catalyst surface are easy to form unsaturated $C_4$–$C_8$ hydrocarbons through a hydrogenating dimerization. In turn, said $C_4$–$C_8$ hydrocarbons will react subsequently with other unsaturated hydrocarbons (acetylene or ethylene etc.) to form $C_6$–$C_{24}$ oligomers (known as "green oil") adhered unavoidably on the selective hydrogenation catalyst. Said adhesion will make the activity and selectivity of the catalyst decrease gradually, shorten the catalyst operation cycle period and service life and lead to more frequent regenerations, thus increase in production costs.

In terms of the support material in the prior art, most catalysts for selective hydrogenation of acetylenic and diolefinic compounds are alumina-supported Pd catalysts. It is also found that $TiO_2$-supported Pd catalyst ( U.S. Pat. No. 4,839,329), $SiO_2$-supported Pd—Zn catalyst (DE 2,156,544), $CaCO_3$-supported Pd—Pb catalyst, and cellular iolite-supported Pd catalyst containing alkali and/or alkali-earth metal (CN 1,176,291A) be used, in this field.

In terms of the active component in the prior art, also included are Pd catalyst systems with a cocatalyst component. The cocatalyst component disclosed in U.S. Pat. No. 4,404,124 is Ag, that in EP 892,252 is Au, that in DE 1284403 and U.S. Pat. No. 4,577,047 is Cr, that in U.S. Pat. No. 3,912,789 is Cu, that in U.S. Pat. No. 3,900,526 is Fe, that in U.S. Pat. No. 3,489,809 is Rh, that in U.S. Pat. No. 3,325,556 is Li, that in CN 1,151,908A is K. Other cocatalyst components disclosed include Pb, Zn etc.

In the aforesaid catalyst systems, some cocatalyst components sacrificed Pd catalyst's selectivity for improving its activity, some of them although can improve the Pd catalyst's selectivity or reduce the green oil formation, their activity reduced significantly. Therefore, only the Pd—Ag catalyst is in common use at present But with respect to its activity and selectivity, Pd—Ag catalyst is still less than satisfactory.

It is an object of this invention to overcome said shortcomings of the prior art, to provide a high selective and high hydrogenation active catalyst system for selective hydrogenation with green oil formation reduced, the service life of the catalyst increased, and the production costs decreased.

It is a further object of the invention to provide a process for the preparation of the catalyst system.

It is another object of the invention that a process for using the catalyst system in a selective hydrogenation of acetylenic and diolefinic compounds in hydrocarbon feeds.

SUMMARY OF THE INVENTION

The selective hydrogenation catalyst system of this invention comprises a support material, a Pd-containing catalyst component, Bi-containing cocatalyst component, wherein the weight percent of Pd-containing catalyst component is 0.001–1 wt. % based on the total weight of the catalyst system, the weight ratio Bi/Pd is 0.01–50, and the balance is the support material The support material is selected from the group consisting of diatomaceous earth, $SiO_2$, $TiO_2$, $Al_2O_3$, and has a shape of granular, spherical, flake or strip, its specific surface area is 1–350 $m^2/g$.

The preferred support material is $Al_2O_3$ or $SiO_2$, its preferred shape is strip or spherical, its preferred specific surface area is 5–280 $m^2/g$, more preferably $^{8-280}$ $m^2/g$. The preferred weight percent of Pd-containing catalyst component is 0.008–0.6 wt. %, more preferably 0.01–0.5 wt. %. The preferred weight ratio Bi/Pd is 0.1–10, more preferably 1–6.

The catalyst system of the invention can further contain optionally at least one other cocatalyst components selected from the group consisting of Ag, Cu, Zn, K, Mg and Ca. In one embodiment of this invention, the Bi-containing cocatalyst component is added on the Pd-containing catalyst component which has combined with one or more other cocatalyst components. Therefore, in the selective hydrogenation of this invention, the activity and selectivity of the catalyst system which has contained the aforesaid cocatalyst components, can be improved and the green oil formation reduced, thus the cycle of operation prolonged.

When using Ag as the aforesaid optional cocatalyst component, the Ag content is 0.001–10 wt. %, preferably 0.01–2 wt. %, based on the total weight of the catalyst system.

DETAILED DESCRIPTION OF THE INVENTION

The catalyst system of this invention is manufactured by impregnating a support material simultaneously or separately with a Pd-containing solution, and a Bi-containing solution, and then drying at 100–300° C. for 5–24 hrs, and calcining at 350–650° C. for 4–20 hrs. Said Pd-containing solution is selected from an aqueous solution of palladium chloride, palladium nitrate, palladium acetate or the like, and Bi-containing solution is selected from the aqueous solution of bismuth nitrate, bismuth chloride or the like.

When this invention is practiced, the support material used in the selective hydrogenation catalyst system of the invention can be diatomaceous earth, $Al_2O_3$, $SiO_2$, $TiO_2$ etc, the preferred support material is $Al_2O_3$. The shape of the support material can be granular, spherical, flake, or extruded strip. the preferred shape is an extrudate. The specific surface area of support material, such as $Al_2O_3$ can be 1–350 m²/g, preferably is 5–280 m²/g, more preferably 8–28 m²/g. The preparation process for the support material such as $Al_2O_3$ is not critical on the properties of the catalyst of the invention, and carbonization method, nitric acid method etc. can be used. The selective hydrogenation catalyst system of the invention comprises, based on the total weight of the supported catalyst system, 0.001–1% of Pd component and 0.001–10% of Group IB cocatalyst metal component, and a Group VA cocatalyst metal. The preferred Group IB cocatalyst metal is Ag and/ or Cu. the preferred Group VA cocatalyst metal is Bi.

When using the stepwise-impregnating method, the procedure is as follows:

firstly, impregnating the support material by using a Pd-containing solution. It is advantageous to impregnate with the largest amount of solution absorbable by the support material. The amount of the Pd-containing solution used should be sufficient such that the calcined catalyst would contain 0.001–1 wt. % of metal Pd. One skilled in the art is easy to determine the appropriate mixing ratio. The Pd-containing solution can be the aqueous solution of palladium chloride, palladium nitrate, palladium acetate, or the like. After impregnating by Pd-salt solution, drying at 100–300° C. for 5–24 hrs. The dried support material can either be impregnated with Bi-containing solution, or impregnated first with Ag-containing solution and then with Bi-containing solution. Preferably, the dried support material can be impregnated with the largest amount of the solution absorbable thereby completely.

When impregnating with Ag-containing solution, this solution is made up from silver nitrate, silver perchlorate, or the like., The amount of Ag-containing solution used should be sufficient such that the calcined catalyst system would contain 0.001–10 wt. % of metal Ag. One skilled in the art is easy to determine the appropriate mixing ratio. The Pd-treated support material that Ag salt solution impregnated is dried at 100–300° C. for 5–24 hrs, the dried support material is impregnated with a Bi-containing solution. Preferably, the dried support material can be impregnated with the largest amount of the solution absorbable thereby completely.

The Bi-containing solution is made up from bismuth nitrate, bismuth chloride, or the like. The amount of Bi-containing solution used should be sufficient such that the calcined catalyst would have a weight ratio Bi/Pd of 0.01–50, preferably 0.1–10, most preferably 1–6. One skilled in the art is easy to determine the appropriate mixing ratio. After impregnating with Bi salt solution, drying at 100–300° C. for 5–24 hrs, and calcining at 350–650° C. for 4–20 hrs. One skilled in the art is easy to determine the appropriate conditions of drying and calcining.

Owing to the addition of Group VA metal Bi as cocatalyst, the selective hydrogenation catalyst system of the invention has more improvement of the activity and selectivity than the prior art, decreases the formation of green oil and carbon deposit after long term operation of the catalyst, thus prolongs the service life of the present catalyst system, operation cycle period and reduces the production costs.

EXAMPLES AND COMPARATIVE EXAMPLES

Comparative Example 1

According to the aforesaid process and operating conditions disclosed, alumina beads having a diameter range of 2.5–4.5 mm were impregnated with an aqueous solution of palladium nitrate. After drying, calcining, 0.03 wt. % Pd/alumina catalyst was prepared. Said catalyst was further impregnated with an aqueous solution of silver nitrate, after drying, calcining, 0.03 wt. % Pd-0.8 wt. % Ag/alumina catalyst (called catalyst A, i.e. equivalent to the catalyst in U.S. Pat. No. 4,404,124) was prepared.

Example 1

300 grams alpha alumina spheres having a diameter of 2.5–4.5 millimeters were prepared. The palladium nitrate aqueous solution was diluted form 3.6 milliliters palladium nitrate aqueous solution containing 25 milligrams palladium per milliliter into a maximal volume which the alpha alumina could absorb(about 150 ml). The alpha alumina was impregnated with the palladium nitrate aqueous solution, after drying at 120° C., Pd/alumina catalyst was obtained; 0.85 grams silver nitrate was dissolved in the water which volume was equal to that of above aqueous solution of palladium nitrate. Pd/alumina catalyst was impregnated with the silver nitrate aqueous solution, after drying at 120° C., Pd—Ag/alumina catalyst was obtained; 0.84 grams bismuth nitrate was dissolved in 5 milliliters 30% nitric acid, then diluted into a volume which was equal to that of above aqueous solution of palladium nitrate with water. Pd—Ag/alumina catalyst was impregnated with the bismuth nitrate aqueous solution, after drying at 120° C. and calcining at 450° C. , a 0.03 wt. % Pd-0.18 wt. % Ag-0.12 % Bi/alumina catalyst (Catalyst A-1) was obtained.

Comparative Example 2

Silica strips having a diameter of 3 mm and a specific surface area of 180 m²/g was sprayed with aqueous solutions of palladium nitrate and zinc nitrate, after drying, calcining, 0.025 wt. % Pd-0,025 wt. % Zn/silica catalyst (called catalyst B, equivalent to the catalyst in GP 1407434) was prepared.

Comparative Example 3

Catalyst B was impregnated with an aqueous solution of silver nitrate, after drying, calcining, 0.025 wt. % Pd-0.112 wt. % Ag-0.025 wt. % Zn/silica catalyst (called catalyst B-1) was prepared.

Example 2

Catalyst B-1 is impregnated with an aqueous solution of bismuth nitrate, after drying, calcining, Pd—Ag—Zn—Bi (Bi/Pd=3)/silica catalyst (called catalyst B-2) was prepared.

Comparative Example 4

Commercial alumina was impregnated with an aqueous solution of palladium chloride, after drying, calcining, 0.03 wt. % Pd/alumina catalyst (called catalyst C, i.e. commercial catalyst BC-037) was prepared.

Example 3

Commercial catalyst BC-037 was impregnated with aqueous solutions of silver nitrate and bismuth nitrate, after drying, calcining, 0.2 wt. %, Pd—Ag—Bi (Bi/Pd=7)/alumina catalyst (called catalyst C-1) was prepared.

Comparative Example 5

Commercial catalyst BC-037 was impregnated with an aqueous solution of silver nitrate, after drying, calcining, 0.03 wt. % Pd-0.2 wt. % Ag/alumina catalyst (called catalyst C-2) was prepared.

Example 4

Commercial catalyst BC-037 was impregnated with an aqueous solution of bismuth nitrate, after drying, calcining, Pd—Bi (Bi/Pd=4)/alumina catalyst (called catalyst C-3) was prepared.

Comparative Example 6

Alumina beads having a diameter range of 2.5–4.5 mm and a specific surface area of 5–70 m$^2$/g was impregnated with an aqueous solution of palladium chloride, after drying, impregnated again with an aqueous solution of silver nitrate, after drying, calcining, 0.028 wt. % Pd-0.21 wt. % Ag/alumina catalyst (called catalyst D) was prepared.

Examples 5–11

Catalyst D was impregnated with an aqueous solution of bismuth nitrate, after drying, calcining, Pd—Ag—Bi (Bi/Pd=28)/alumina catalyst (called catalyst D-1) (Example 5), Pd—Ag—Bi (Bi/Pd=9)/alumina catalyst (called catalyst D-2) (Example 6); Pd—Ag—Bi (Bi/Pd=6)/alumina catalyst (called catalyst D-3) (Example 7); Pd—Ag—Bi (Bi/Pd=5)/alumina catalyst (called catalyst D-4) (Example 8), Pd—Ag—Bi (Bi/Pd=3)/alumina catalyst (called catalyst D-5) (Example 9), Pd—Ag—Bi (Bi/Pd=1.5)/alumina catalyst (called catalyst D-6) (Example 10); Pd—Ag—Bi (Bi/Pd=0.3)/alumina catalyst (called catalyst D-7) (Example 11) are prepared.

The aforesaid results are shown in Table 1.

Catalysts obtained in aforesaid comparative examples and examples were further used to perform hydrogenation experiment, the reaction conditions were as follows:

200 ml catalyst was packed into a tubular reactor, glass beads were packed on the top of the catalyst bed and under the bottom thereof After displacing by nitrogen gas, and reducing, the hydrogen-mixed feed gas from the top of a deethanizer was passed from top to bottom through the reactor under the following conditions: H$_2$/alkyne=1.3, inlet temperature of the reactor: 30° C., inlet concentration of alkyne: 1.2 mol %, space velocity: 6000 hr$^{-1}$, single bed reactor.

Under the aforesaid conditions, after the catalyst C, C-1, D, and D-6 reacting respectively for 250 hrs, the collected amount of green oil and the weight gain of the catalyst (i.e. the total weight of green oil and carbon deposit on each catalyst) was weighted carefully. Especially, it implies that the more fewer the weight gain of the catalyst, the more longer the operating period of a catalyst.

TABLE 1

Back-end Hydrogenation Catalyst for C$_2$ Hydrocarbon Feeds

| No. | Example # | Catalyst # | Support material | Pd-containing catalyst component Pd % | Cocatalyst component BiPd | Ag wt. % | Acetylene hydrogenation conversion % | Ethylene selectivity % |
|---|---|---|---|---|---|---|---|---|
| 1 | Comparative Example 1 | A | Alumina Beads having a diameter of 2.5–4.5 mm | 0.03; palladium nitrate | | 0.18; silver nitrate | 69 | 60 |
| 2 | Example 1 | A-1 | Same as above | Same as above | 4 | 0.18; silver nitrate | 90 | 71 |
| 3 | Comparative Example 2 | B | Silica strike having a diameter of 3 mm | 0.025 palladium nitrate | | 0.025; zinc nitrate | 33.3 | −184 |
| 4 | Comparative Example 3 | B-1 | Same as above | 0.025 palladium nitrate | | 0.025; zinc nitrate 0.012; silver nitrate | 38.3 | −98 |
| 5 | Example 2 | B-2 | Same as above | 0.025; palladium nitrate | 3 | 0.025; zinc nitrate 0.012; silver nitrate | 50.7 | 18 |
| 6 | Comparative Example 4 | C | Alumina | 0.03 palladium chloride | | | 44.1 | −19 |
| 7 | Example 3 | C-1 | Same as above | Same as above | 7 | 0.17; silver nitrate | 98.1 | 64 |
| 8 | Comparative Example 5 | C-2 | Same as above | Same as above | | 0.2; silver nitrate | 85.4 | 55 |
| 9 | Example 4 | C-3 | Same as above | Same as above | 4 | | 93 | 71 |
| 10 | Comparative Example 6 | D | Alumina beads having a diameter of 2.5–4.5 mm and specific surface area of 5–70 m$^3$/g | 0.028 palladium chloride | | 0.21; silver nitrate | 53 | 70 |
| 11 | Example 5 | D-1 | Same as above | Same as above | 28 | Same as above | 34 | 89 |
| 12 | Example 6 | D-2 | Same as above | Same as above | 9 | Same as above | 56.2 | 79 |
| 13 | Example 7 | D-3 | Same as above | Same as above | 6 | Same as above | 58.1 | 84 |
| 14 | Example 8 | D-4 | Same as above | Same as above | 5 | Same as above | 63.2 | 80 |
| 15 | Example 9 | D-5 | Same as above | Same as above | 3 | Same as above | 66.6 | 85 |
| 16 | Example 10 | D-6 | Same as above | Same as above | 1.5 | Same as above | 73.1 | 88 |
| 17 | Example 11 | D-7 | Same as above | Same as above | 0.3 | Same as above | 57.2 | 80 |

TABLE 2

Back-end Hydrogenation Catalyst for C$_2$ Hydrocarbon Feeds

| Example # | Comparative Example 4 | Example 3 | Comparative Example 6 | Example 10 |
|---|---|---|---|---|
| Catalyst # | C | C-1 | D | D-6 |
| Weight gain of a catalyst after reacting for 250 hrs. gram | 46.76 | 11.12 | 13.66 | 7.06 |
| Green oil weight after reacting for 250 hrs. gram. | 78.6 | 59.6 | 55.8 | 46.4 |

TABLE 2-continued

Gas Phase Hydrogenation Catalyst for $C_3$ Hydrocarbon Feeds

| No. | Example # | Catalyst # | Support $Al_2O_3$ | Catalyst component | Cocatalyst component Bi/Pd | MAPD conversion % | Propylene selectivity % |
|---|---|---|---|---|---|---|---|
| 18 | Comparative Example 7 | E | Diameter 2.5–4.5 mm | Pd = 0.031 wt % | 0 | 84.2 | 78 |
| 19 | Example 12 | E-1 | | | 3.9 | 87.9 | 85.1 |
| 20 | Example 13 | E-2 | | | 2.4 | 88.8 | 88.0 |

Comparative Example 7

Commercial γ-$Al_2O_3$ was impregnated with an aqueous solution of palladium chloride, after drying, calcining, Pd/$Al_2O_3$ catalyst (called catalyst E) was prepared.

Examples 12 and 13

Catalyst E was impregnated with an aqueous solution of bismuth nitrate, after drying, calcining, two catalysts (called respectively catalyst E-1 (Bi/Pd=3.9) and E-2 (Bi/Pd=2.4)) were prepared.

1 ml above catalyst was packed into a tubular reactor. Glass beads were packed on the top of the catalyst bed and under the bottom thereof After displacing by nitrogen gas, and reducing, the $C_3$ hydrocarbon feeds in gas phase was passed through the reactor under the following conditions: $H_2$/alkyne=1.5, inlet temperature of reactor: 60° C., inlet concentration of alkyne: 2 mol. %, and space velocity: 6000 $hr^{-1}$.

Liquid Phase Hydrogenation Catalyst for $C_3$ Hydrocarbon Feeds

| No. | Example # | Catalyst # | Support $Al_2O_3$ | Catalyst component | Cocatalyst component Bi/Pd | MAPD conversion % | Propylene selectivity % |
|---|---|---|---|---|---|---|---|
| 21 | Comparative Example 8 | F | Diameter 2.5–4.5 mm | Pd = 0.3 wt. % | 0 | 50 | 10 |
| 22 | Example 14 | F-1 | | Pd = 0.3 wt. % | 0.5 | 50 | 45 |

Comparative Example 8

Commercial α-$Al_2O_3$ was impregnated with an aqueous solution of palladium chloride, after drying, calcining, Pd/$Al_2O_3$ catalyst (called catalyst F) was prepared.

Example 14

Catalyst F was impregnated with an aqueous solution of bismuth nitrate, after drying, calcining, the catalyst (Bi/Pd=0.5) (called catalyst F-1) was prepared.

1 ml above catalyst was packed into a reactor. Glass beads were packed on the top of the catalyst bed and under the bottom thereof. After displacing by nitrogen gas and reducing, the hydrogen-mixed liquid $C_3$ hydrocarbon feeds was passed through the reactor under the following conditions:

$H_2$/alkyne=1.5, inlet temperature of the reactor:35° C., methylacetylene and propadiene (MAPD) concentration: 2 mol %, liquid hourly space velocity: 70 $hr^{-1}$.

Catalyst for Hydrogenation and Refining of $C_4$ Raffinate By Removing Diolefins and Acetylenes Therefrom

| No. | Example # | Catalyst # | Support | Catalyst component | Cocatalyst component Ag/Pd | Cocatalyst component Bi/Pd | Butadiene conversion % | Butylene yield % |
|---|---|---|---|---|---|---|---|---|
| 23 | Comparative Example 9 | G | α-$Al_2O_3$ | Pd = 0.5% | 0.1 | 0 | 100 | 94.5 |
| 24 | Example 15 | G-1 | α-$Al_2O_3$ | Pd = 0.5% | 0.1 | 3 | 100 | 98.5 |

Comparative Example 9

Commercial α-$Al_2O_3$ was impregnated with an aqueous solution of palladium chloride, after drying, calcining, impregnating again with an aqueous solution of, silver nitrate, after drying, calcining, 0.5 wt. % Pd-0.05 wt. % Ag/$Al_2O_3$ catalyst (called catalyst G) was prepared.

Example 15

Catalyst G in comparative example 9 was impregnated with an aqueous solution of a bismuth salt, after drying, calcining, a catalyst having 1.5 wt. % of Bi (called catalyst G-1) was prepared.

100 ml catalyst was packed into an isothermal bed reactor, glass beads were packed on the top of the catalyst bed and under the bottom thereof After displacing by nitrogen gas, and reducing, the hydrogen-mixed $C_4$ raffinate was passed through the reactor under the following conditions: $H_2$/alkyne=2.0, inlet temperature of reactor: 35° C., inlet concentration of alkyne: 0.6 mol. %, liquid hourly space velocity: 30 $hr^{-1}$.

Selective Hydrogenation Catalyst for Removing
Diolefins and Acetylenes from $C_4$ Hydrocarbon Feeds

| No. | Example # | Catalyst # | Support $Al_2O_3$ | Catalyst component | Cocatalyst component Bi/Pd | Alkyne content in products (ppm) | Loss of butadiene % |
|---|---|---|---|---|---|---|---|
| 25 | Comparative Example 10 | H | Diameter 2.5–4.5 mm | Pd = 0.2 % | 0 | <20 | <3 |
| 26 | Example 16 | H-1 | Diameter 2.5–4.5 mm | Pd = 0.2 % | 4 | <10 | <1 |

Comparative Example 10

Commercial $\theta$-$Al_2O_3$ was impregnated with an aqueous solution of palladium chloride, after drying, calcining, Pd/$Al_2O_3$ catalyst (called catalyst H) was prepared.

Example 16

Catalyst H was impregnated with an aqueous solution of bismuth nitrate, after drying, calcining, catalyst having Bi/Pd=4 (called catalyst H-1) was prepared.

100 ml above catalyst was packed into an adiabetic tubular bed reactor, glass beads were packed on the top of the catalyst bed and under the bottom thereof. After displacing by nitrogen gas, and reducing, the hydrogen-mixed $C_4$ gas feed from the top of a debutanizer was passed through the reactor under the following conditions: $H_2$/alkyne=2.2, inlet temperature of reactor: 45° C., inlet concentration of alkyne: 0.6 mol %, liquid hourly space velocity: 30 $hr^{-1}$.

First Stage Low Temperature
Hydrogenation Catalyst For Cracked Gasoline

| No. | Example # | Catalyst # | Support $Al_2O_3$ | Catalyst component | Cocatalyst component Bi/Pd | Hydrogenation of diolefins in products, % | Hydrogenation selectivity of Diolefins, % |
|---|---|---|---|---|---|---|---|
| 27 | Comparative Example 11 | I | Diameter 2.5–4.5 mm | Pd = 0.28% | 0 | 95 | 27 |
| 28 | Example 17 | I-1 | Diameter 2.5–4.5 mm | Pd = 0.28% | 4 | 98 | 40 |

Comparative Example 11

Commercial $\delta$-$Al_2O_3$ was impregnated with an aqueous solution of palladium chloride, after drying, calcining, Pd/$Al_2O_3$ catalyst (called catalyst I) was prepared.

Example 17

Catalyst I was impregnated with an aqueous solution of bismuth nitrate, after drying, calcining, the catalyst having Bi/Pd=4 (called catalyst I-1) was prepared.

300 ml catalyst was packed into an tubular adiabetic bed reactor, for enabling he fluid to distribute uniformly in the reactor, triangle packing and Raschig ring were packed on the top of catalyst bed as the predistributor of liquid, and glass beads were packed under the bottom of catalyst bed. The hydrogen-mixed $C_5$–$C_{10}$ hydrocarbon feeds from the bottom of debutanizer was passed through the reactor under the following conditions: $H_2$/alkyne=1.6, inlet temperature of reactor: 30° C., diolefins value of inlet feed: 12.0–14.0, liquid hourly space velocity: 10 $hr^{-1}$.

Front-end Hydrogenation Catalyst for $C_2$ Hydrocarbon Feeds

| No. | Example # | Catalyst # | Support | Catalyst component | Cocatalyst component Ag/Pd | Cocatalyst component Bi/Pd | MAPD Conversion % | Acetylene Conversion % | Acetylene Selectivity % |
|---|---|---|---|---|---|---|---|---|---|
| 29 | Comparative Example 12 | J | $\alpha$-$Al_2O_3$ | Pd = 0.02% | 2.5 | 0 | 45 | 100 | 18 |
| 30 | Example 18 | J-1 | $\alpha$-$Al_2O_3$ | Pd = 0.02% | 2.5 | 1 | 55 | 100 | 55 |

Comparative Example 12

Commercial cylindrical $\alpha$-$Al_2O_3$ was impregnated with an aqueous solution of palladium chloride, after drying, impregnating with an aqueous solution of silver nitrate, after drying, calcining, Pd—Ag/alumina catalyst (called catalyst J) was prepared.

Example 18

Catalyst J of comparative example 12 was impregnated with an aqueouse solution of a bismuth salt, after drying, calcining, an Pd—Ag—Bi/alumina catalyst with 0.02 wt. % of bismuth (called Catalyst J-1) was prepared.

100 ml above catalyst was packed into a tubular reactor. Glass beads were packed on the top of the catalyst bed and under the bottom thereof. After displacing by nitrogen gas, methane, hydrogen, carbon monoxide, $C_2$ and $C_3$ hydrocarbon feeds was passed through the reactor from top to bottom so as to carry out a hydrogenation experiment for 100 hrs. under the following conditions: inlet temperature: 65° C., inlet acetylene: 0.6 mol. %, methyl acetylene and propadiene(MAPD): 0.5 mol. %, and gas hourly space velocity: 10000 $hr^{-1}$.

What is claimed is:

1. A process of selectively hydrogenating acetylenic and diolefinic compounds in $C_2$–$C_4$ hydrocarbon feeds comprising contacting said hydrocarbon feeds under selective hydrogenation conditions with a selective hydrogenation catalyst system comprising: a support material, a Pd-containing catalyst component, and a Bi-containing co-catalyst component, wherein the weight percent of said Pd-containing catalyst component is from 0.001 to 1 wt. % based on the total weight of the catalyst system; the weight ratio Bi:Pd is from 0.01:1 to 50:1; and the balance is the support material.

2. The process of claim 1, wherein the weight percent of Pd-containing catalyst component is from 0.008 to 0.6 wt. %.

3. The process of claim 2, wherein the weight percent of Pd-containing catalyst component is from 0.01 to 0.5 wt. %.

4. The process of claim 1, wherein the weight ratio Bi:Pd is from 0.1:1 to 10:1.

5. The process of claim 4, wherein the weight ratio Bi:Pd is from 1:1 to 6:1.

6. The process of claim 1, wherein the support material is selected from the group consisting of diatomaceous earth, $SiO_2$, $TiO_2$, and $Al_2O_3$, wherein the support material has a shape selected from the group consisting of granular, spherical, flake and strip, and wherein the support material has a specific surface area of from 1 to 350 $m^2/g$.

7. The process of claim 6, wherein the support material is $Al_2O_3$ or $SiO_2$, wherein the shape is strip or spherical, and wherein the specific surface area is from 5 to 280 $m^2/g$.

8. The process of claim 1, wherein the co-catalyst component further comprises at least one selected from the group consisting of Ag, Cu, Zn, K, Mg, and Ca.

9. The process of claim 8, wherein the co-catalyst component comprises Ag.

10. The process of claim 9, wherein the Ag content is from 0.01 to 10 wt. % based on the total weight of said catalyst system.

11. The process of claim 10, wherein the Ag content is from 0.01 to 2 wt. %.

* * * * *

UNITED STATES PATENT AND TRADEMARK OFFICE
CERTIFICATE OF CORRECTION

PATENT NO.    : 6,459,008 B1
DATED         : October 1, 2002
INVENTOR(S)   : Wei Dai et al.

It is certified that error appears in the above-identified patent and that said Letters Patent is hereby corrected as shown below:

Title page,
Item [57], ABSTRACT,
Line 11, "diolefmic" has been replaced with -- diolefinic --.

Signed and Sealed this

Eleventh Day of March, 2003

JAMES E. ROGAN
*Director of the United States Patent and Trademark Office*